United States Patent
Banatwala et al.

(10) Patent No.: US 9,590,929 B2
(45) Date of Patent: Mar. 7, 2017

(54) DIRECTED MESSAGE NOTIFICATION IN CHAT SESSIONS

(71) Applicant: International Business Machines Corporation, Armonk, NY (US)

(72) Inventors: Mustansir Banatwala, Hudson, NH (US); David A. Brooks, Arlington, MA (US); Joseph A. Russo, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 13/860,657

(22) Filed: Apr. 11, 2013

(65) Prior Publication Data

US 2014/0310357 A1    Oct. 16, 2014

(51) Int. Cl.
| | |
|---|---|
| G06F 15/16 | (2006.01) |
| H04L 12/58 | (2006.01) |
| H04L 12/18 | (2006.01) |

(52) U.S. Cl.
CPC .......... *H04L 51/04* (2013.01); *H04L 12/1827* (2013.01); *H04L 51/16* (2013.01)

(58) Field of Classification Search
CPC .......... H04L 51/04; H04L 51/18; H04L 51/32
See application file for complete search history.

(56) References Cited

U.S. PATENT DOCUMENTS

| | | | |
|---|---|---|---|
| 7,278,108 B2 | 10/2007 | Duarte et al. | |
| 7,890,595 B2 | 2/2011 | Haynes et al. | |
| 2006/0020677 A1* | 1/2006 | von Koch | 709/207 |
| 2007/0033255 A1* | 2/2007 | Sanjeeva et al. | 709/206 |
| 2007/0143401 A1 | 6/2007 | Lance et al. | |
| 2007/0143417 A1* | 6/2007 | Daigle | 709/206 |
| 2010/0036929 A1 | 2/2010 | Scherpa et al. | |
| 2011/0060591 A1 | 3/2011 | Chanvez et al. | |
| 2011/0307569 A1* | 12/2011 | Sacks et al. | 709/206 |
| 2012/0023113 A1 | 1/2012 | Ferren et al. | |
| 2013/0091205 A1* | 4/2013 | Kotler et al. | 709/204 |

OTHER PUBLICATIONS

"highlighted message for specific user in a multiple users chat", Authors Disclosed Anonymously, IP.com Prior Art Database, IPCOM000210021D, Aug. 22, 2011.

* cited by examiner

*Primary Examiner* — Aftab N. Khan
*Assistant Examiner* — Jean P Mendez Flores
(74) *Attorney, Agent, or Firm* — Daniel R. Simek

(57) ABSTRACT

Embodiments of the present invention disclose a method, computer program product, and system for managing messages in an instant messaging chat session. A computer receives a directed message in the instant messaging chat session, wherein the directed message includes an identification of one or more accounts associated with individuals in the instant messaging chat session. The computer determines accounts associated with individuals in the instant messaging chat session that correspond to the directed message, wherein the accounts associated with individuals that correspond to the directed message include an account associated with an individual that sent the directed message, and the one or more accounts associated with individuals identified in the directed message. The computer displays directed message notifications to the determined accounts associated with individuals that correspond to the directed message. In another embodiment, the computer receives a response to a directed message, and updates the directed message notifications.

17 Claims, 7 Drawing Sheets

DIRECTED MESSAGE NOTIFICATION IN CHAT SESSIONS

FIELD OF THE INVENTION

The present invention relates generally to the field of network communications, and more particularly to message notifications in chat sessions.

BACKGROUND OF THE INVENTION

Collaborative computing allows a multitude of individuals to interact with each other through utilizing desktop computers, laptops, mobile devices, or other types of computing systems in a collaboration session. Instant messaging chat sessions are an important part of collaboration sessions. Chat sessions are implemented with computing devices utilizing collaboration software (i.e. an instant messaging or web conferencing program) that are connected through a network. The amount of individuals in a chat session can include a large number of individuals, down to as many as two individuals.

In many examples, chat sessions can be used for group discussions. In such examples, many individuals in the chat sessions can be discussing different topics with certain individuals in the chat session. An individual can use a directed message to send a message to a specific individual in the chat session. Directed messages can allow individuals to pose questions to a specific individual in the chat session, or to answer a question posed by another specific individual in the chat session.

SUMMARY

Embodiments of the present invention disclose a method, computer program product, and system for managing messages in an instant messaging chat session. A computer receives a directed message in the instant messaging chat session, wherein the directed message includes an identification of one or more accounts associated with individuals in the instant messaging chat session. The computer determines accounts associated with individuals in the instant messaging chat session that correspond to the directed message, wherein the accounts associated with individuals that correspond to the directed message include an account associated with an individual that sent the directed message, and the one or more accounts associated with individuals identified in the directed message. The computer displays directed message notifications to the determined accounts associated with individuals that correspond to the directed message. In another embodiment, the computer receives a response to a directed message, and updates the directed message notifications responsive to the response to the directed message.

DETAILED DESCRIPTION

Figure 1:
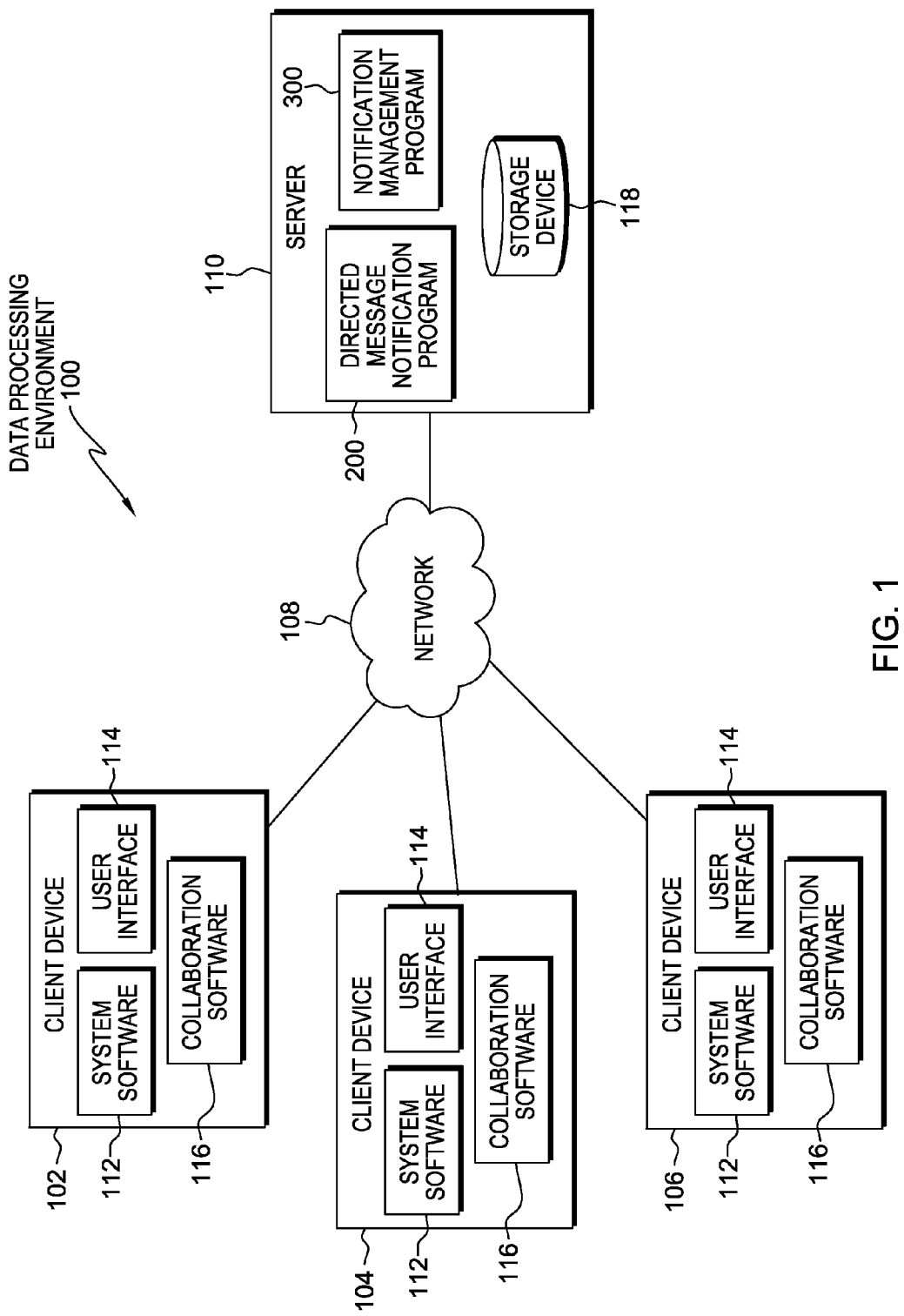
FIG. 1 is a functional block diagram of a data processing environment in accordance with an embodiment of the present invention.

Exemplary embodiments of the present invention allow for management of directed messages in an instant messaging chat session. In one embodiment, when a directed message is received into an instant messaging session, individuals indicated in the directed message (i.e. sender and one or more recipients) are notified through notifications in a user interface of the instant messaging session.

Embodiments of the present invention recognize that in collaboration sessions, especially collaboration sessions including a large number of participants, many different discussions can be going on between different groups of individuals. In such situations, individuals may experience difficulty keeping track of messages directed at the individual, or keep track of messages that the individual directed at another individual(s). This can decrease the ability to effectively provide responses to directed messages, or see a response to a directed message, which can bring down the effectiveness of the chat session.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating data processing environment 100, in accordance with one embodiment of the present invention.

An exemplary embodiment of data processing environment 100 includes client devices 102, 104, and 106, network 108, and server 110. In various embodiments of the present invention, client devices 102, 104 and 106 may be workstations, personal computers, personal digital assistants, mobile phones, or any other devices capable of executing program instructions. In general, client devices 102, 104, and 106 are representative of any electronic device or combination of electronic devices capable of executing machine-readable program instructions, as described in greater detail with regard to FIG. 5. In alternate embodiments, data processing environment 100 can include other instances of client devices 102, 104 and 106 (i.e. can have more or less). In an exemplary embodiment, client devices 102, 104, and 106 can access server 110 through network 108.

Client devices 102, 104, and 106 include system software 112, user interface 114, and collaboration software 116. In one embodiment, each instance of client devices 102, 104, and 106 includes iterations of the same system software 112, user interface 114, and collaboration software 116. In one embodiment, system software 112 may exist in the form of operating system software, which may be Windows®, LINUX®, and other application software such as internet applications and web browsers. User interface 114 allows for input into client devices 102, 104, and 106. In exemplary embodiments, user interface 114 allows individuals utilizing client devices 102, 104, and 106 to establish and participate in chat session while utilizing collaboration software 116. In one embodiment, individuals utilizing client devices 102, 104 and 106 utilize collaboration software 116 to communicate with elements of data processing environment 100 (i.e. client devices, server 110) in collaboration sessions. Some examples of collaboration sessions can include instant messaging conversations, teleconferences, electronic meetings, or other forms electronic collaboration between client devices 102, 104, and 106. In one embodiment, a collaboration session can be an instant messaging chat session, or an electronic meeting including instant messaging chat communications. In an example, individuals utilizing client devices 102, 104, and 106 can communicate with one another in an instant messaging chat session through utilization of collaboration software 116.

In exemplary embodiments, collaboration software 116 utilizes example collaboration session interface 400 (depicted in FIG. 4A) as a user interface to individuals utilizing client devices 102, 104, and 106. Example collaboration session interface 400 includes a participant list 402, a chat transcript window 404, and a data entry field 406. In exemplary embodiments, participant list 402 is a list including accounts associated with all individuals that are in the exemplary collaboration session. Chat transcript window 404 includes all the chat communications in the collaboration session. Data entry field 406 allows an individual to compose messages to be posted in chat transcript window 404. In exemplary embodiments, an individual in a collaboration session can use data entry field 406 to compose a directed message toward another individual in the collaboration session. An individual in a chat session can use a directed message to send a message to a specific individual in the chat session. In exemplary embodiments, directed messages allow individuals to pose questions to a specific individual in the collaboration session, or to answer a question posed by a specific individual in the collaboration session. In this exemplary embodiment, example collaboration session interface 400 is depicted from the point of view of one individual (Dan) in the collaboration session.

In one embodiment, client devices 102, 104, and 106, and server 110 communicate through network 108. Network 108 can be, for example, a local area network (LAN), a telecommunications network, a wide area network (WAN) such as the Internet, or a combination of the three, and include wired, wireless, or fiber optic connections. In general, network 108 can be any combination of connections and protocols that will support communications between client devices 102, 104, and 106, and server 110 in accordance with exemplary embodiments of the present invention.

In exemplary embodiments, server 110 can be a desktop computer, a computer server, or any other computer systems known in the art. In certain embodiments, server 110 represents a computer system utilizing clustered computers and components (e.g., database server computers, application server computers, etc.) that act as a single pool of seamless resources when accessed by elements of data processing environment 100. In general, server 110 is representative of any electronic device or combination of electronic devices capable of executing machine-readable program instructions, as described in greater detail with regard to FIG. 5. Server 110 facilitates collaboration sessions between client devices 102, 104, and 106 through network 108, and stores corresponding information. In an exemplary embodiment, a collaboration session that server 110 facilitates can include individuals utilizing client devices 102, 104, and 106, and also other individuals.

In one embodiment, server 110 includes storage device 118, directed message notification program 200, and notification management program 300. Storage device 118 can be implemented with any type of storage device that is capable of storing data that may be accessed and utilized by client devices 102, 104, and 106, and server 110, such as a database server, a hard disk drive, or flash memory. In other embodiments, storage device 118 can represent multiple storage devices within server 110. In exemplary embodiments, storage device 118 stores information corresponding to collaboration sessions between client devices 102, 104, and 106. Information that storage device 118 stores can include, but is not limited to: transcripts of instant messaging chats in collaboration sessions (discussed in greater detail with regard to FIG. 2). In exemplary embodiments, directed message notification program 200 provides notifications to individuals included in a directed message. Directed message notification program 200 is discussed in greater detail with regard to FIG. 2. In exemplary embodiments, notification management program 300 updates directed message notifications responsive to a response of an individual. Notification management program 300 is discussed in greater detail with regard to FIG. 3. In exemplary embodiments, directed message notification program 200 and notification management program 300 operate during instant messaging chats and collaboration sessions utilizing server 110.

Figure 2:
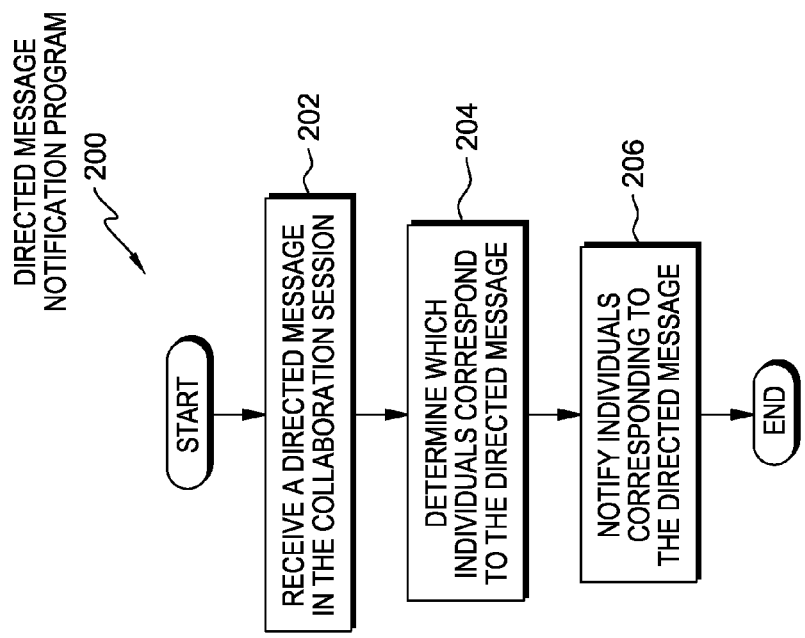
FIG. 2 is a flowchart depicting operational steps of a program for providing directed message notifications, in accordance with an embodiment of the present invention.

FIG. 2 is a flowchart depicting operational steps of directed message notification program 200 in accordance with an exemplary embodiment of the present invention. In one embodiment, directed message notification program 200 initiates at the beginning of a collaboration session, and operates throughout the collaboration session. In exemplary embodiments, a collaboration session can include three or more individuals.

In step 202, directed message notification program 200 receives a directed message in the collaboration session. In one embodiment, an individual utilizing client device 102, 104 or 106 can input a directed message into data entry field 406 of example collaboration session interface 400. In one embodiment, directed message notification program 200 identifies a directed message when a message is input into the collaboration session, and the message identifies another individual in the collaboration session. In an example with regard to example collaboration session interface 400, a message directed at Andrew can include "@Andrew" in the input to data entry field 406. In another embodiment, a directed message can be directed at multiple individuals in the collaboration session. In exemplary embodiments, individuals in the collaboration session can define specific words that directed message notification program 200 can utilize to identify a directed message (i.e. variations of an individuals name, project names, and specific keywords). In an example with regard to the individual Dan in example collaboration session interface 400, Dan defines a directed message as messages including "Dan" and "Daniel". In this example, directed message notification program 200 identifies all received messages including "Dan" and "Daniel" as directed messages toward the account associated with Dan. In another example with regard to example collaboration interface 400, an individual can define a directed message as messages including mentions of "Project 123". In this example, directed message notification program 200 identifies all received messages including "Project 123" as directed messages toward the account associated with the individual. In exemplary embodiments, directed message notification program 200 determines that a directed message is received when the directed message input in a collaboration session includes a reference to one or more individuals in the collaboration session (i.e. @<an account name associated with an individual>), or includes specific words defined by an individual (i.e. variations of an individuals name, project names, and specific keywords).

In step 204, directed message notification program 200 determines which individuals correspond to the directed message. In one embodiment, directed message notification program 200 determines the account associated with the individual that sent the directed message, and the account associated with the one or more individuals included in the directed message. In exemplary embodiments, directed message notification program 200 utilizes determined references to one or more accounts associated with individuals in the collaboration session (from step 202) to determine the one or more individuals that are intended recipients of the directed message. In an example with regard to example collaboration interface 400, a message is sent from an account associated with Andrew and includes the text "@ Dan". In this example, directed message notification program 200 determines that the accounts associated with Andrew and Dan correspond to the directed message. In the previously discussed example regarding Dan defining a directed message as messages including "Dan" and "Daniel", a message is sent from an account associated with Neil and includes the text "Daniel". In this example, directed message notification program 200 determines that the accounts associated with Neil and Dan correspond to the directed message. In another example with regard to example collaboration session interface 400, Dan defines a directed message as messages including mentions of "Project 123". In this example, a message is sent from an account associated with Russell and includes the text "Project 123". In the example, directed message notification program 200 determines that the accounts associated with Russell and Dan correspond to the directed message.

In step 206, directed message notification program 200 notifies individuals corresponding to the directed message. In one embodiment, directed message notification program 200 notifies the account associated with the individual that sent the directed message, and the account associated with the individual indicated in the directed message. In exemplary embodiments, example directed message notifications 410 depicts example collaboration session interface 400 (for Dan) including received directed message notification 412 and sent directed message notification 414 (depicted in FIG. 4B). In an example with regard to example directed message notifications 410, directed message notification program 200 determines that the message from an account associated with Neil ("@Dan, What Time?") is directed to an account associated with Dan (in step 204). In this example, directed message notification program 200 notifies the account associated with Dan of a directed message through directed message notification 412 in the participant list of the collaboration session. In exemplary embodiments, when a message is directed at an account of an individual in a collaboration session, directed message notification program 200 depicts a notification (i.e. directed message notification 412) on a display next to the name of the account associated with the individual in the participant list of the collaboration session. In another example with regard to example directed message notifications 410, directed message notification program 200 determines that the message from an account associated with Dan ("@Garrett, Do you have to work tomorrow?") is directed to an account associated with Garrett (in step 204). In this example, directed message notification program 200 utilizes sent directed message notification 414 positioned next to the account associated with Garrett (the individual indicated in the directed message) in the participant list of the collaboration session to indicate to the account associated with Dan that the message is directed to the account associated with Garrett. In exemplary embodiments, when an individual directs a message at an account associated with an individual in the collaboration session, directed message notification program 200 depicts a notification (i.e. sent directed message notification 414) on the display next to the name of the account associated with the individual indicated in the directed message in the participant list of the collaboration session. In one embodiment, directed message notification program 200 displays directed message notifications that correspond to the account associated with the individual in the collaboration session interface.

In one embodiment, directed message notification program 200 runs throughout a collaboration session to notify individuals in the collaboration session of all directed message sent and/or received. In exemplary embodiments, directed message notification program 200 updates directed message notifications (i.e. directed message notification 412 and sent directed message notification 414) as more directed messages are input into the collaboration session. In an example with regard to example directed message notifications 410, directed message notification program 200 receives another message into the collaboration session that indicates the account associated with Dan. In this example, directed message notification program 200 updates directed message notification 412 to reflect that there are two directed message notifications by changing the numerical indicator inside the notification to be "2". In exemplary embodiments, directed message notifications (i.e. directed message notification 412 and sent directed message notification 414) can be any format inside the participant list of a collaboration session including a numerical indication of the number of notifications. In another embodiment, directed message notification program 200 indicates a directed message notification (i.e. directed message notification 412 and sent directed message notification 414) in chat transcript window 404 next to the directed message. In an example with regard to directed message notifications 410, directed message notification program 200 indicates another instance of directed message notification 412 next to "@Dan, What Time".

Figure 3:
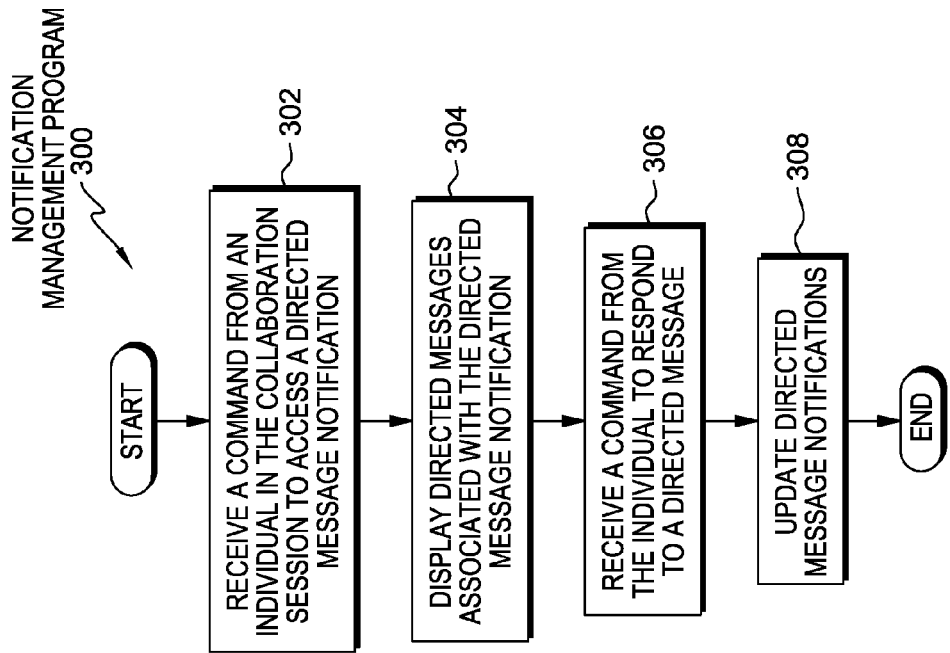
FIG. 3 is a flowchart depicting operational steps of a program for managing directed message notifications, in accordance with an exemplary embodiment of the present invention.

FIG. 3 is a flowchart depicting operational steps of notification management program 300 in accordance with an exemplary embodiment of the present invention.

In step 302, notification management program 300 receives a command from an individual in the collaboration session to access a directed message notification. In one embodiment, notification management program 300 initiates when an individual in the collaboration session selects a directed message notification (i.e. directed message notification 412 and sent directed message notification 414). In exemplary embodiments, the individual can select the directed message notification through interaction with collaboration software 116 of client devices 102, 104 or 106 (i.e. clicking on a notification). In one embodiment, an individual utilizing client device 102, 104 or 106 can select directed message notification appearing in participant list 402, or chat transcript window 404. In an exemplary embodiment, an individual in a collaboration session can indicate an application to track outstanding directed messages. In another embodiment, an individual in the collaboration session (i.e. a moderator or chairperson of the collaboration session) can utilize outstanding directed message notifications to assign directed messages to an appropriate individual or individuals in the collaboration session.

In step 304, notification management program 300 displays the directed message associated with the directed message notification. In one embodiment, when an individual in a collaboration session selects a directed message notification in a collaboration session, notification management program 300 displays one or more directed messages associated with the directed message notification. FIG. 4C depicts example notification window 420 that includes selected directed message notification 422, notification window 424, ignore notification icons 426 and 430, and answered notification icons 428 and 432. In an example with regard to example notification window 420, Dan selects selected directed message notification 422 (in step 302). In this example, notification management program 300 displays notification window 424, which includes directed messages for the account associated with Dan that have not had a response from Dan. In example notification window 420, notification window 424 includes ignore notification icon 426 and answered notification icon 428 associated with a directed message from an account associated with Neil, and ignore notification icon 430 and answered notification icon 432 associated with a directed message from an account associated with Casey. In exemplary embodiments with regard to example notification window 420, Dan can select ignore notification icons 426 and 432 to ignore the directed message without providing a response, and select answered notification icons 428 and 430 to indicate that a response has been provided for the directed message. In another embodiment with regard to example notification window 420, Dan can respond to a directed message by selecting the directed message in notification window 424. In exemplary embodiments, notification window 424 can appear in the form of a window inside a collaboration session interface (i.e. example collaboration session interface 400), or as a window separate from the collaboration session interface. In another example with regard to example directed message notifications 410, Dan selects sent directed message notification 412. In this example, notification management program 300 displays a notification window that includes directed messages at accounts associated with other individuals in the collaboration session.

In step 306, notification management program 300 receives a command from the individual to respond to a directed message. With regard to example notification window 420, the command to respond to a directed message can be a selection of ignore notification icon 426 or 430, answered notification icon 428 or 432, or a selection of a directed message in notification window 424. In exemplary embodiments with regard to example notification window 420, Dan sends a command to notification management program 300 to respond to a directed message by selecting the text of the directed message in notification window 424, selecting ignore notification icon 426 and 430, and selecting answered notification icon 428 and 432. In another embodiment, an individual in a collaboration session can send a command to notification management program 300 to respond to a directed message notification in chat transcript window 404 of example collaboration session interface 400. In exemplary embodiments, an individual in the collaboration session can select the text of a directed message in notification window 424 to view where the directed message appears in chat transcript window 404. In a first example with regard to example notification window 420, Dan sends a command to notification management program 300 to respond to the directed message sent by an account associated with Neil by selecting the text of the directed message from the account associated with Neil in notification window 424. In this example, Dan can input a response to the directed message from the account associated with Neil, notification management program 300 associates the response to the directed message with the directed message from the account associated with Neil.

In step 308, notification management program 300 updates directed message notifications. In one embodiment, responsive to a response to a directed message, notification management program 300 updates directed message notification for the account associated with the individual that sent the directed message, and the accounts of the one or more individuals indicated in the directed message. In the previously discussed example of Dan responding to the directed message from the account associated with Neil, notification management program 300 updates the directed message notifications to reflect that the directed message from the account associated with Neil has been answered. In this example, the response to the directed message is associated with the directed message in chat transcript window 404. In one embodiment, example response window 440 includes directed message notification 442 and response window 444. In an exemplary embodiment, when Dan responds to the directed message from the account associated with Neil, and notification management program 300 associates the response to the directed message in the chat transcript window. In this example, the individuals corresponding to the directed message (Dan and Neil) can utilize directed message notification 442 to view the response to the directed message in response window 444. In exemplary embodiment, notification management program 300 utilizes different notification formatting for directed messages that are awaiting a response, and directed messages that have received a response.

In another example with regard to example notification window 420, Dan has already answered the directed message from the account associated with Neil. In this example, Dan sends a command to notification management program 300 to respond to the directed message sent by an account associated with Neil by selecting answered notification icon 428 (step 306). Notification management program 300 updates the directed message notification to indicate that the directed message has been answered. In exemplary embodiments, when an individual in the collaboration session indicates that a directed message has been answered, notification management program 300 removes the directed message from notification window 424, and notifies the individual that sent the directed message that the message has been answered. In another example with regard to example notification window 420, Dan does not need to provide a response to the directed message from the account associated with Casey (@Dan, Probably Not). In this example, Dan sends a command to notification management program 300 to respond to the directed message sent by an account associated with Casey by selecting ignore notification icon 428 (step 306). Notification management program 300 updates the directed message notification to indicate that the directed message has been ignored. In exemplary embodiment, when an individual in a collaboration session selects to ignore a directed message, notification management program 300 removes the directed message from notification window 424, which reduces the number of direct message notifications toward the individual. In another embodiment, an individual in the collaboration session can save the chat transcript along with directed messages that have responses, and directed messages that do not have responses. In one embodiment, storage device 118 stores chat transcripts and logs of directed messages, and responses to directed messages of the collaboration session.

Figure 4A:
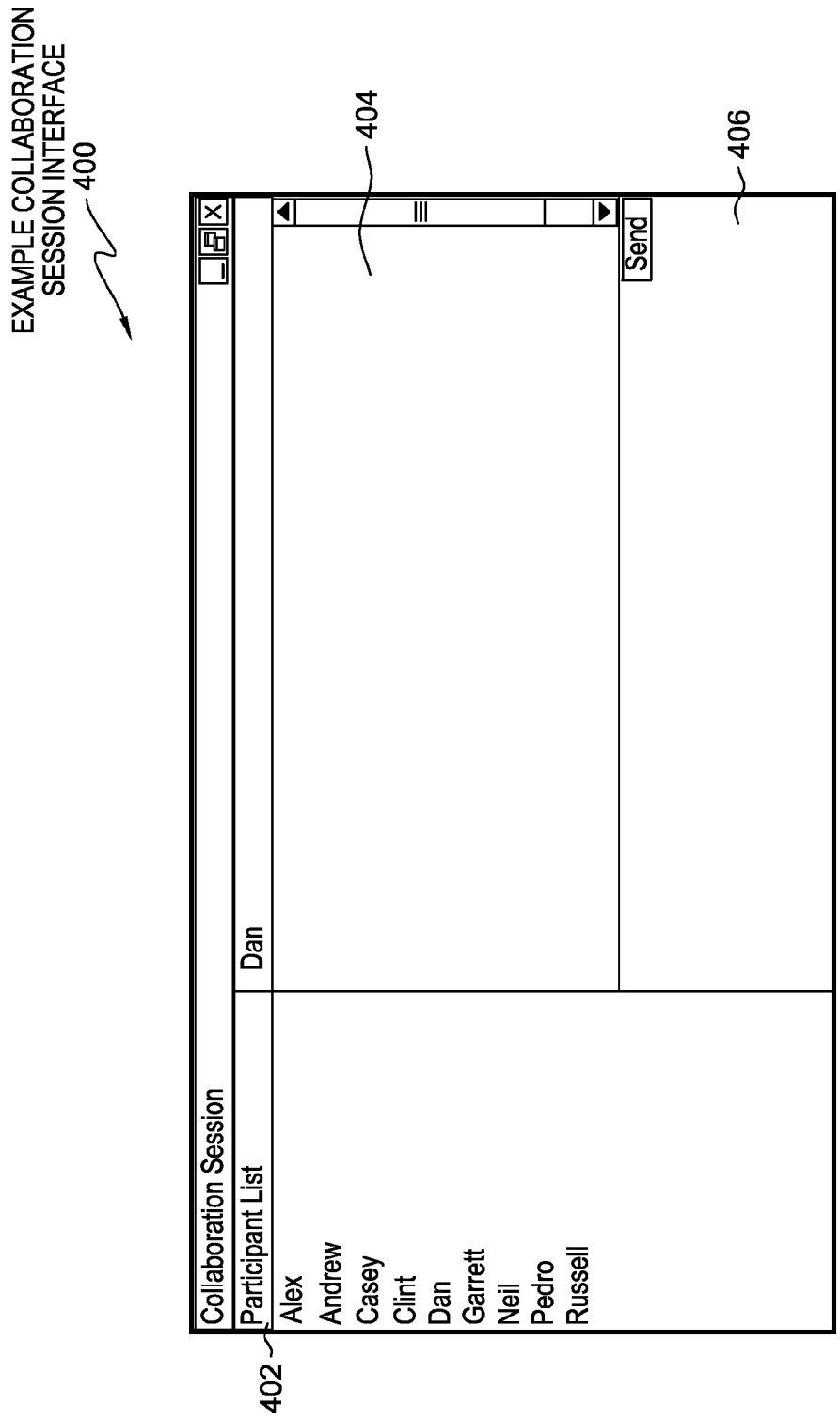
FIGS. 4A, B, C and D are depictions of exemplary chat session interfaces, in accordance with an embodiment of the present invention.
Figure 4B:
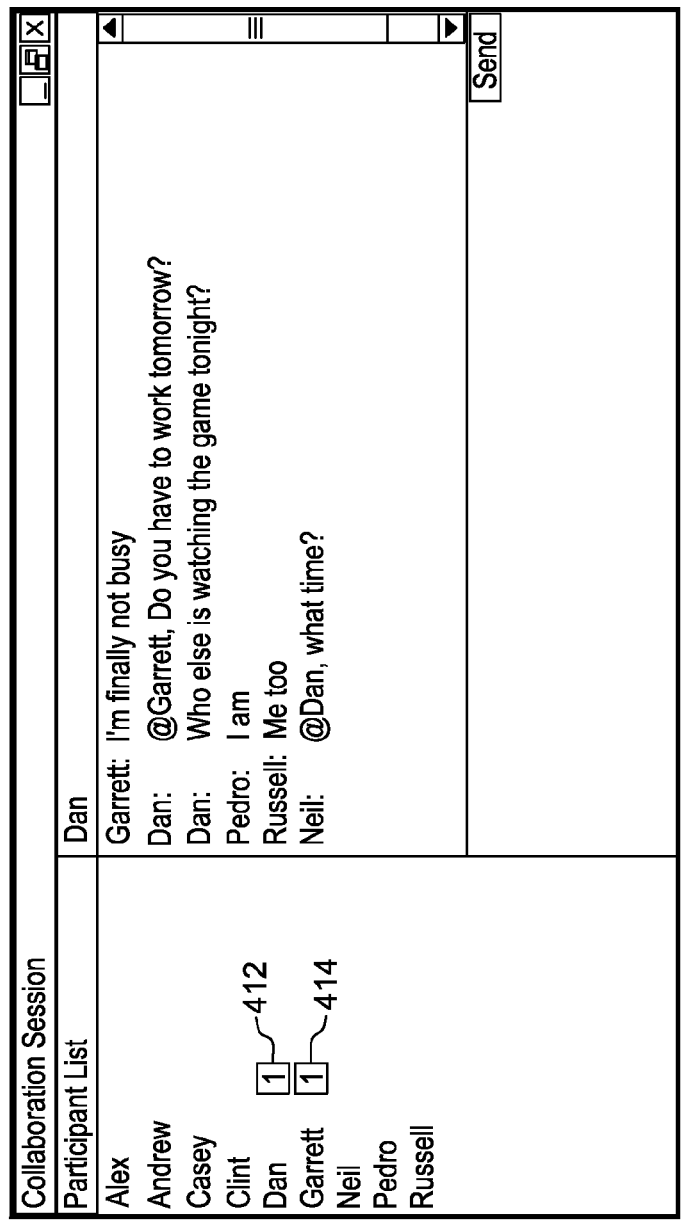
Figure 4C:
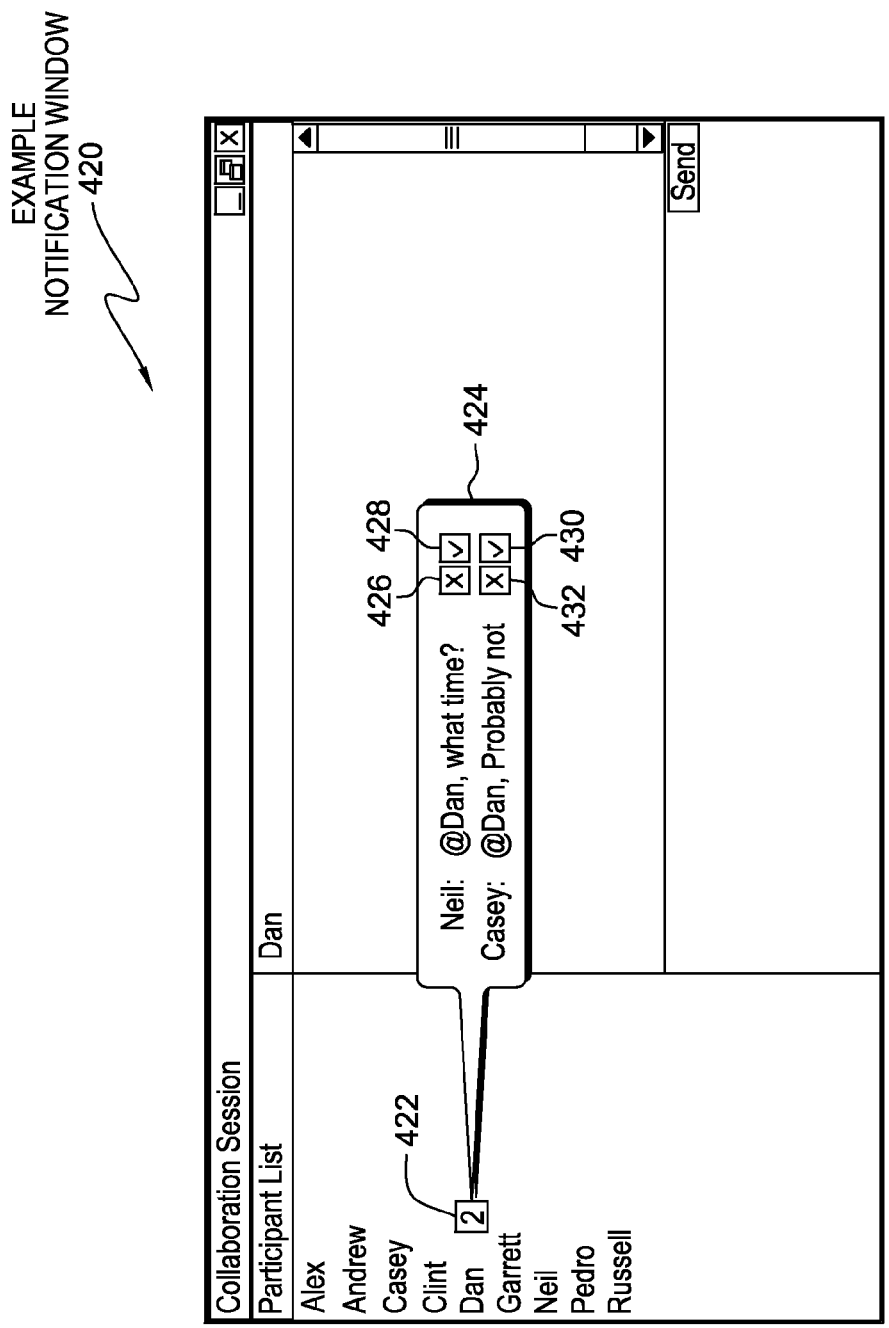
Figure 4D:
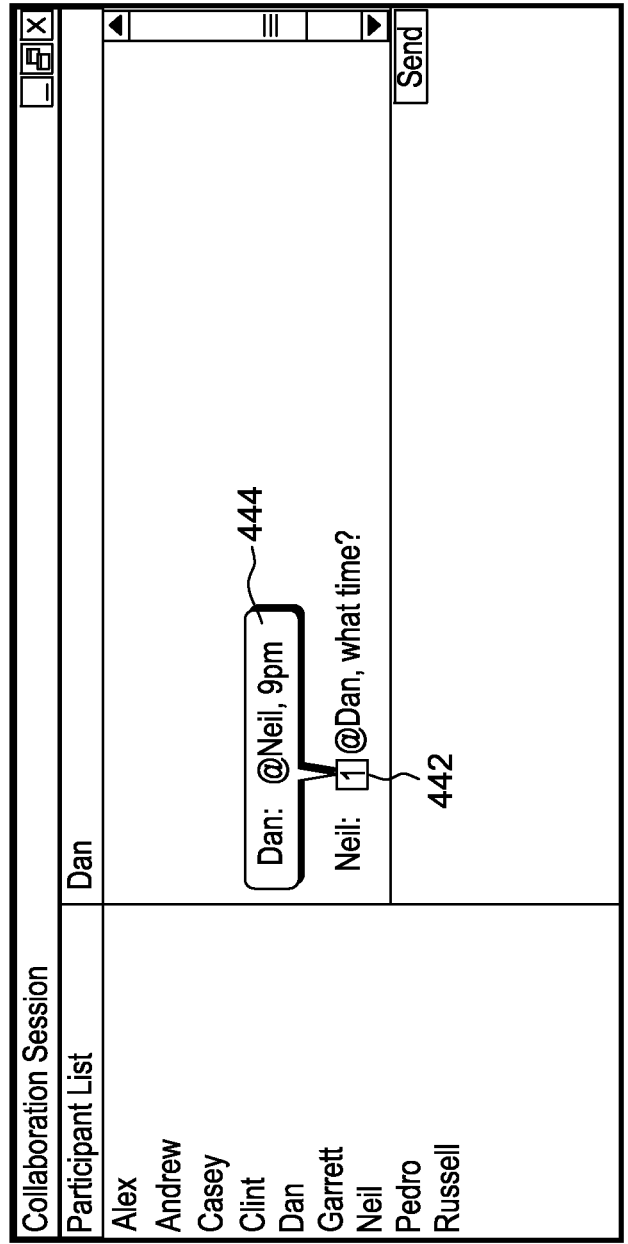

FIGS. 4A, B, C, and D are exemplary depictions of a chat session interfaces in accordance with exemplary embodiments of the present invention as described herein above.

Figure 5:
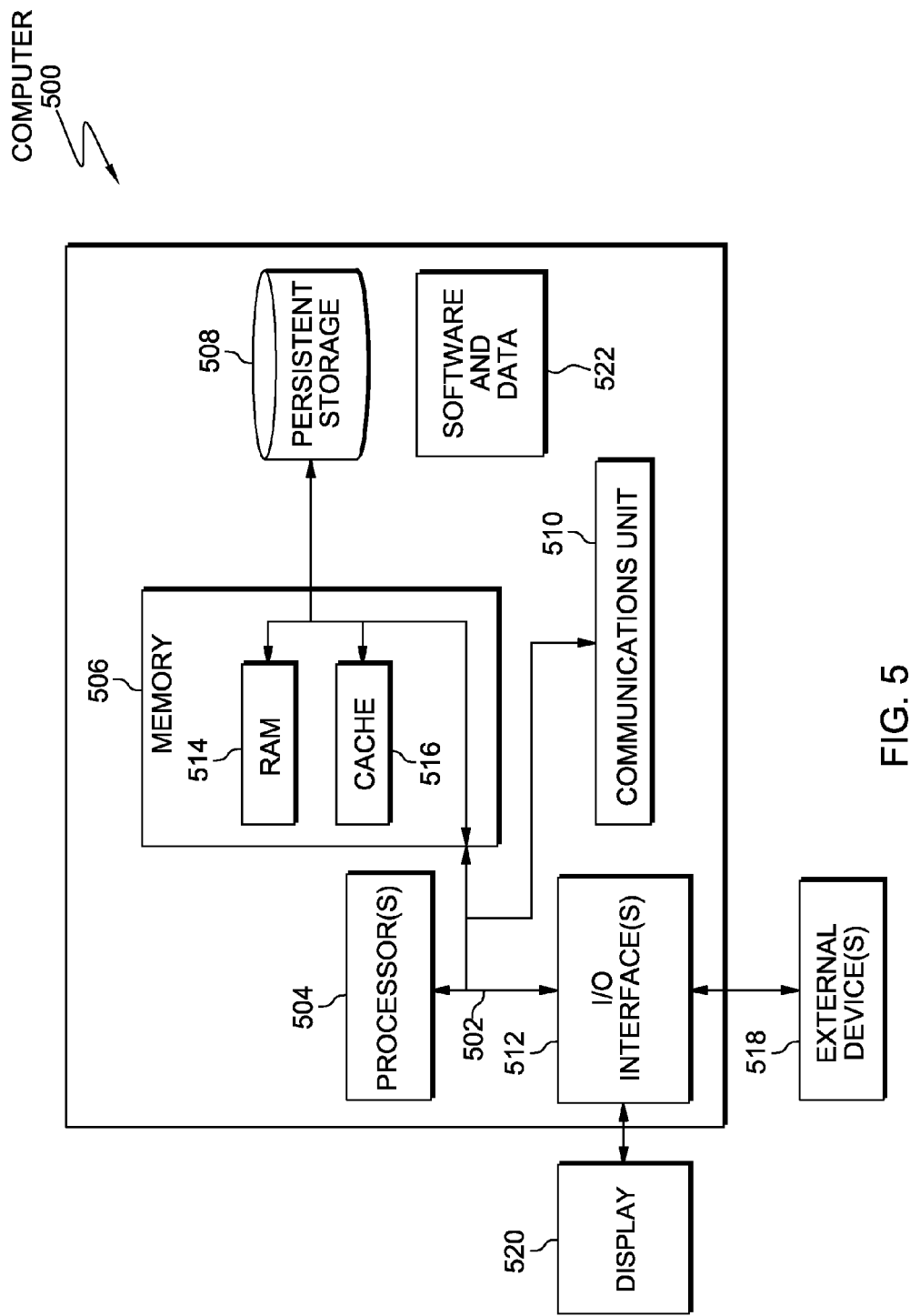
FIG. 5 depicts a block diagram of components of the computing system of FIG. 1 in accordance with an embodiment of the present invention.

FIG. 5 depicts a block diagram of components computer 500, which is representative of client devices 102, 104, and 106, and server 110 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media. Software and data 522 stored in persistent storage 508 for access and/or execution by processor(s) 504 via one or more memories of memory 506. With respect to client devices 102, 104, and 106, software and data 522 includes system software 112 and collaboration software 116. With respect to server 110, software and data 522 includes directed message notification program 200 and notification management program 300.

In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Software and data 522 may be downloaded to persistent storage 508 through communications unit 510.

I/O interface(s) 512 allows for input and output of data with other devices that may be connected to computer 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data 522 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor. Display 520 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing messages in an instant messaging chat session, the method comprising:
   a computer receiving a directed message input into an instant messaging chat session: during the instant messaging chat session, by an individual in the instant messaging chat session, wherein the directed message is an instant messaging chat message that is input into a user interface of into the instant messaging chat session, is directed to one or more accounts associated with individuals in the instant messaging chat session, and is displayed in a chat transcript window of the user interface of the instant messaging chat session;
   the computer determining accounts associated with individuals in the instant messaging chat session that correspond to the directed message, wherein the accounts associated with individuals that correspond to the directed message include an account associated with an individual that sent the directed message, and the one or more accounts associated with individuals identified in the directed message;
   the computer displaying directed message notifications to the determined accounts associated with individuals that correspond to the directed message, wherein the directed message notifications are displayed in a respective user interface of the instant messaging chat sessions corresponding to the determined accounts associated with individuals that correspond to the directed message, and wherein the directed message notifications are displayed as a respective numerical indicator in a participant list portion of the user interface of the instant messaging chat session;
   the computer receiving a command, from a participant in the instant messaging chat session, to access a directed message notification displayed in the participant list portion of the user interface, wherein the receiving the command comprises the participant selecting a numerical indicator in the participant list portion of the user interface;
   in response to receiving the command from the participant to access the directed message the computer modifying the respective user interface of the instant messaging chat session for the participant to display at least one directed message that is associated with the selected numerical indicator;
   the computer receiving a response to at least one directed message that is associated with the selected numerical indicator and is displayed in the respective user interface of the instant messaging chat session, wherein the received response to the directed message is an instant messaging chat message that is displayed in the chat transcript window of the user interface of the instant messaging chat session; and
   the computer updating the displayed directed message notification.

2. The method of claim 1, wherein the receiving the response to the directed message associated with the directed message notification comprises:
   the computer receiving an indication of the directed message; and
   the computer receiving a response to the indicated directed message, wherein the response is a message to the account associated with the individual that sent the directed message, or an indication that the indicated directed message has been answered or to ignore the identified directed message.

3. The method of claim 1, wherein the updating of the displayed directed message notifications comprises:
   the computer notifying the account associated with the individual that sent the directed message of the response to the directed message; and
   the computer reducing the directed message notifications for the accounts associated with the individuals in the instant messaging chat session that correspond to the directed message to indicate that the directed message has a response.

4. The method of claim 1, further comprising:
the computer determining the directed message utilizing defined keywords of an account associated with an individual in the instant messaging chat session.

5. The method of claim 1, further comprising:
the computer storing a log of the instant messaging chat session in a storage device, wherein the log of the instant messaging chat session includes at least in part, a transcript of the instant messaging chat session, directed messages with corresponding responses, and directed messages without corresponding responses.

6. The method of claim 1, wherein the computer receiving a directed message input into an instant messaging chat session by an individual in the instant messaging chat session, further comprises:
the computer identifying an individual inputting the directed message into a user interface of the instant messaging chat session; and
the computer determining that the input directed message includes text indicating that the directed message is directed to one or more accounts associated with individuals in the instant messaging chat session.

7. The method of claim 1, wherein the numerical indicator provides an indication of a number of directed messages that have been (i) input into the instant messaging chat session, (ii) are directed to a particular individual in the instant messaging chat session, and (ii) are directed messages that have been sent from an individual(s) that are in the instant messaging chat session.

8. A computer program product for managing messages in an instant
messaging chat session, the computer program product comprising:
one or more computer-readable storage devices and program instructions stored on the one or more computer-readable storage devices, the program instructions comprising:
program instructions to receive a directed message input into an instant messaging chat
session, during the instant messaging chat session, by an individual in the instant messaging chat session, wherein the directed message is an instant messaging chat message that is input into a user interface of the instant messaging chat session, is directed to one or more accounts associated with individuals in the instant messaging chat session, and is displayed in a chat transcript window of the user interface of the instant messaging chat session;
program instructions to determine accounts associated with individuals in the instant messaging chat session that correspond to the directed message, wherein the accounts associated with individuals that correspond to the directed message include an account associated with an individual that sent the directed message, and the one or more accounts associated with individuals identified in the directed message;
program instructions to display directed message notifications to the determined accounts associated with individuals that correspond to the directed message, wherein the directed message notifications are displayed in a respective user interface of the instant messaging chat sessions corresponding to the determined accounts associated with individuals that correspond to the directed message, and wherein the directed message notifications are displayed as a respective numerical indicator in a participant list portion of the user interface of the instant messaging chat session;
program instructions to receive a command, from a participant in the instant messaging chat session, to access a directed message notification displayed in the participant list portion of the user interface, wherein the receiving the command comprises the participant selecting a numerical indicator in the participant list portion of the user interface;
in response to receiving the command from the participant to access the directed message program instructions to modify the respective user interface of the instant messaging chat session for the participant to display at least one directed message that is associated with the selected numerical indicator;
program instructions to receive a response to at least one directed message that is associated with the selected numerical indicator and is displayed in the respective user interface of the instant messaging chat session, wherein the received response to the directed message is an instant messaging chat message that is displayed in the chat transcript window of the user interface of the instant messaging chat session; and program instructions to update the displayed directed message notification.

9. The computer program product of claim 8, wherein the program instructions to receive the response to the directed message associated with the directed message notification comprises program instructions to:
receive an indication of the directed message; and
receive a response to the indicated directed message, wherein the response is a message to the account associated with the individual that sent the directed message, or an indication that the indicated directed message has been answered or to ignore the identified directed message.

10. The computer program product of claim 8, wherein the program instructions to update the displayed directed message notifications comprises program instructions to:
notify the account associated with the individual that sent the directed message of the response to the directed message; and
reduce the directed message notifications for the accounts associated with the individuals in the instant messaging chat session that correspond to the directed message to indicate that the directed message has a response.

11. The computer program product of claim 8, further comprising program instructions to:
determine the directed message utilizing defined keywords of an account associated with an individual in the instant messaging chat session.

12. The computer program product of claim 6, wherein the numerical indicator provides an indication of a number of directed messages that have been (i) input into the instant messaging chat session, (ii) are directed to a particular individual in the instant messaging chat session, and (ii) are directed messages that have been sent from an individual(s) that are in the instant messaging chat session.

13. A computer system for managing messages in an instant messaging chat session, the computer system comprising:
one or more computer processors;
one or more computer-readable storage media;

program instructions stored on the computer-readable storage media for execution by at least one of the one or more processors, the program instructions comprising:

program instructions to receive a directed message input into an instant messaging chat session, during the instant messaging chat session, by an individual in the instant messaging chat session, wherein the directed message is an instant messaging chat message that is input into a user interface of the instant messaging chat session, is directed to one or more accounts associated with individuals in the instant messaging chat session, and is displayed in a chat transcript window of the user interface of the instant messaging chat session;

program instructions to determine accounts associated with individuals in the instant messaging chat session that correspond to the directed message, wherein the accounts associated with individuals that correspond to the directed message include an account associated with an individual that sent the directed message, and the one or more accounts associated with individuals identified in the directed message;

program instructions to display directed message notifications to the determined accounts associated with individuals that correspond to the directed message, wherein the directed message notifications are displayed in a respective user interface of the instant messaging chat sessions corresponding to the determined accounts associated with individuals that correspond to the directed message, and wherein the directed message notifications are displayed as a respective numerical indicator in a participant list portion of the user interface of the instant messaging chat session;

program instructions to receive a command, from a participant in the instant messaging chat session, to access a directed message notification displayed in the participant list portion of the user interface, wherein the receiving the command comprises the participant selecting a numerical indicator in the participant list portion of the user interface; in response to receiving the command from the participant to access the directed message, program instructions to modify the respective user interface of the instant messaging chat session for the participant to display at least one directed message that is associated with the selected numerical indicator;

program instructions to receive a response to at least one directed message that is associated with the selected numerical indicator and is displayed in the respective user interface of the instant messaging chat session, wherein the received response to the directed message is an instant messaging chat message that is displayed in the chat transcript window of the user interface of the instant messaging chat session; and program instructions to update the displayed directed message notification.

14. The computer system of claim 13, wherein the program instructions to receive the response to the directed message associated with the directed message notification comprises program instructions to:

receive an indication of the directed message; and receive a response to the indicated directed message, wherein the response is a message to the account associated with the individual that sent the directed message, or an indication that the indicated directed message has been answered or to ignore the identified directed message.

15. The computer system of claim 13, wherein the program instructions to update the displayed directed message notifications comprises program instructions to:

notify the account associated with the individual that sent the directed message of the response to the directed message; and reduce the directed message notifications for the accounts associated with the individuals in the instant messaging chat session that correspond to the directed message to indicate that the directed message has a response.

16. The computer system of claim 13, further comprising program instructions to:

determine the directed message utilizing defined keywords of an account associated with an individual in the instant messaging chat session.

17. The computer system of claim 13, wherein the numerical indicator provides an indication of a number of directed messages that have been (i) input into the instant messaging chat session, (ii) are directed to a particular individual in the instant messaging chat session, and (ii) are directed messages that have been sent from an individual(s) that are in the instant messaging chat session.

* * * * *